United States Patent

Hamano et al.

Patent Number: 5,352,534
Date of Patent: Oct. 4, 1994

[54] ORIENTED POLYESTER FILM

[75] Inventors: Hisashi Hamano, Sagamihara; Masahiro Hosoi, Tokyo; Masanori Nishiyama, Sagamihara; Yasuhiro Saeki, Sagamihara, all of Japan

[73] Assignee: Teijin Limited, Osaka, Japan

[21] Appl. No.: 203,923

[22] Filed: Mar. 1, 1994

Related U.S. Application Data

[62] Division of Ser. No. 32,102, Mar. 17, 1993, Pat. No. 5,312,893.

[30] Foreign Application Priority Data

Mar. 19, 1992 [JP] Japan .................................. 4-63444
Mar. 19, 1992 [JP] Japan .................................. 4-63445
Mar. 27, 1992 [JP] Japan .................................. 4-71093

[51] Int. Cl.⁵ .............................................. B32B 27/36
[52] U.S. Cl. .................................... 428/480; 528/176; 528/185; 528/190; 528/195; 528/272; 528/297; 528/298; 528/308; 428/694 B; 264/210.7
[58] Field of Search ............... 528/176, 185, 190, 195, 528/272, 297, 298, 308; 428/480, 694; 264/210.7

[56] References Cited

U.S. PATENT DOCUMENTS 3,935,166  1/1976  Kanai et al. .................... 528/190
4,619,869  10/1986  Kiriyama et al. .................... 428/480
4,761,327  8/1988  Hamano et al. .................... 428/220

Primary Examiner—Samuel A. Acquah
Attorney, Agent, or Firm—Sherman and Shalloway

[57] ABSTRACT

An oriented polyester film (A) which comprises modified polyethylene-2,6-naphthalenedicarboxylate containing a 4,4'-diphenyldicarboxylic acid component and having a heat of crystallization of 16 to 25.5 Joule/g, and (B) which is biaxially oriented; and an oriented polyester film (A') which comprises modified polyethylene-2,6-naphthalenedicarboxylate containing of a glycol component derived from a compound represented by the following formula,

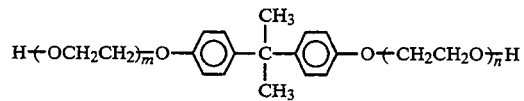

wherein each of n and m is independently a positive number of 1 to 9 as an average, provided that m+n equals 2 to 9 as an average, and having a heat of crystallization of 6 to 20 Joule/g, and (B) which is biaxially oriented. These films are useful as a base film for a magnetic recording tape or as an electric insulation film.

12 Claims, No Drawings

ORIENTED POLYESTER FILM

This is a division of application Ser. No. 08/032,102 filed Mar. 17, 1993 U.S. Pat. No. 5,312,893.

BACKGROUND OF THE INVENTION

1. Field of the Invention

The present invention relates to a biaxially oriented polyester film, and more specifically, it relates to a biaxially oriented polyester film which is formed from modified polyethylene-2,6-naphthalenedicarboxylate, and is particularly useful as a base film for a magnetic recording tape and as an electrically insulating film.

2. Prior Art

A biaxially oriented Polyethylene terephthalate film has been hitherto known as a base film for a magnetic recording tape. A magnetic recording tape formed of such a base film has a low coercive force. It is therefore necessary to decrease the tape thickness in order to make it possible to encase a longer tape in a cassette for recording of longer duration. However, when the tape thickness is decreased, there is a problem in that the running properties and durability of the tape deteriorate.

There are therefore a number of proposals for use of a biaxially oriented polyethylene-2,6-naphthalenedicarboxylate film having a high Young's modulus as a base film for a magnetic recording tape.

However, even if a magnetic recording tape is produced from the above polyethylene-2,6-naphthalenedicarboxylate film having a high Young's modulus and a low heat shrinkage factor, several problems occur when the thickness of the base film is decreased in order to achieve the long recording and reproduction.

For example, the tape undergoes elongation and deformation due to a varied tension at the time of start and stop in tape running, and due to this, a strain consequently occurs in recorded data. Further, such problems occur that one edge of the tape is elongated and bent, and the running tape is stuck in a guide.

Further, there might be another problem. Due to a reason that the affinity between various fine particles added for imparting lubricity and polyethylene-2,6-naphthalenedicarboxylate is insufficient, voids might be formed between the fine particles and the polymer, and the fine particles and peeled portions of the polymer might drop from the film. As a result, the base film is abraded at steps of die coater treatment and calender treatment in producing a magnetic tape.

On the other hand, a biaxially oriented polyethylenenaphthalate film is used as an electrically insulating film, and a biaxially oriented polyethylene-2,6-naphthalenedicarboxylate film is recently attracting attention. An electrically insulating film is required to have the following properties. (1) It is required to show no deterioration in mechanical properties, insulation performance and electric breakdown even when exposed to a high temperature for a long time. (2) It is required to cause no delamination (interlayer peeling) when used. (3) The amount of low-molecular-weight substances (oligomers) present in the film and on its film surface is required to be small.

A method of increasing the molecular orientation by increasing the draw ratio is effective for improving the heat deterioration resistance and decreasing the amount of oligomers exuded from the film surface, and this method is employed in general practice. However, this method involves another problem in that as a result of the increase in the area drawing ratio, the film tends to cause delamination. Therefore, the increasing of the draw ratio has a limit.

Oh the other hand, a decreasing of the area draw ratio might avoid the film delamination. However, in this case, the heat deterioration resistance decreases, and the amount of oligomers exuded from the film surface increases.

SUMMARY OF THE INVENTION

It is an object of the present invention to provide an oriented polyester film useful as a base film for producing a magnetic recording tape.

It is another object of the present invention to provide an oriented polyester film capable, as a base film, of giving a magnetic recording tape which permits recording of long duration, which undergoes little elongation and deformation under a varied tension at the time of start and stop in running, which is free from a strain in recorded data and fluctuation in output, and which shows excellent electromagnetic conversion.

It is further another object of the present invention to provide an oriented polyester film, use of which as a base film permits to substantially prevent abrasion caused by a die coater and a calender treatment in producing a magnetic recording tape.

It is yet another object of the present invention to provide an oriented polyester film useful for electric insulation.

It is still further another object of the present invention to provide an oriented polyester film useful for electric insulation, which is excellent in heat deterioration resistance and delamination resistance and whose oligomer content is small.

According to the present invention, the above objects and advantages of the present invention are achieved, first, by an oriented polyester film (hereinafter referred to as first invention):

(A) which is comprises modified polyethylene-2,6-naphthalenedicarboxylate obtained containing a 4,4'-diphenyldicarboxylic acid component and having a heat of crystallization (hereinafter sometimes referred to as "a crystallization heat") of 16 to 25.5 Joule/g, and (B) which is biaxially oriented.

According to a preferred embodiment of the first invention further, there is provided an oriented polyester film showing a heat of fusion of the crystal (hereinafter sometimes referred to as "a crystal fusion heat") of 10 to 24 Joule/g, and this oriented polyester film is useful as an electrically insulating film.

According to the present invention, the above objects and advantages of the present invention are achieved, second, by an oriented polyester film (hereinafter referred to as "second invention"):

(A') which comprises modified polyethylene-2,6-naphthalenedicarboxylate containing a glycol component derived from a compound represented by the following formula,

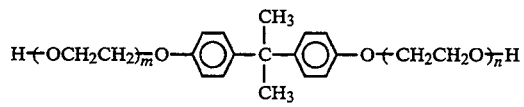

wherein each of n and m is independently a positive number of 1 to 9 as an average, provided that m+n equals 2 to 9 as an average, and having a heat of crystallization of 6 to 20 Joule/g, and (B) which is biaxially oriented.

According to a preferred embodiment of the second invention, further, there is provided an oriented polyester film having a heat of crystallization of 7 to 22 Joule/g, and this oriented polyester film is useful as an electrically insulating film.

The present invention will be further detailed hereinafter, from which the above objects and advantages and other objects and advantages will be apparent.

DETAILED DESCRIPTION OF THE INVENTION

The first invention will be detailed first. The modified polyethylene-2,6-naphthalenedicarboxylate (to be sometimes referred to as modified polyester (I) hereinafter) composing the oriented polyester film of the first invention contains, as a main recurring unit, ethylene-2,6-naphthalenedicarboxylate of the formula (1).

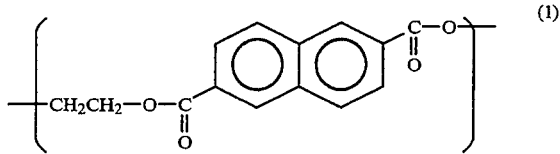

Further, the modified polyethylene-2,6naphthalenedicarboxylate contains a 4,4'-diphenyldicarboxylic acid component in addition to the 2,6-naphthalenedicarboxylic acid component. The component derived from 4,4'-diphenyldicarboxylic acid is contained in the modified polyester (I) in such an amount that the modified polyester (1) shows a crystallization heat of 16 to 25.5 Joule/g, preferably 20 to 25.5 Joule/g, when measured by a method to be described later.

The amount of the component derived from 4,4'-diphenyldicarboxylic acid based on the total content of acid components is preferably 1 to 5 mol%, particularly preferably 1 to 3.5 mol%.

The 2,6-naphthalenedicarboxylic acid component is a main acid component, and the amount of the 2,6-naphthalenedicarboxylic acid component is preferably 95 to 99 mol%, particularly preferably 96.5 to 99 mol%.

For forming an acid component to compose the modified polyethylene-2,6-naphthalate (I), there may be used a small amount of dicarboxylic acid other than 2,6-naphthalenedicarboxylic acid and 4,4'-diphenyldicarboxylic acid. Specific examples of the above other dicarboxylic acid include aromatic dicarboxylic acids such as 1,5-naphthalenedicarboxylic acid, terephthalic acid, isophthalic acid, diphenylsulfonedicarboxylic acid and benzophenonedlcarboxylic acid; aliphatic dicarboxylic acids such as succinic acid, adipic acid, sebacic acid and dodecanedicarboxylic acid; and alicyclic dicarboxylic acids such as hexahydroterephthalic acid and 1,3-adamantanedlcarboxylic acid.

For forming a glycol component, there may be used a small amount of other glycol in addition to ethylene glycol. The other glycol includes 1,3-propanediol, 1,4-butanediol, 1,6-hexanediol, neopentyl glycol, 1,4-cyclohexanedimethanol and p-xylylene glycol.

Ethylene glycol is a main component of glycol components, and the amount of ethylene glycol component based on the total content of glycol components is at least 90 mol%, particularly preferably at least 95 mol%.

The crystallization heat of the modified polyester (I) is 6 to 25.5 Joule/g, preferably 20 to 25.5 Joule/g, as was already described. When the modified polyester (I) shows a crystallization heat in the above range, the film produced from the modified polyester (I) can maintain stretchability and a high Young's modulus. Further, when the film is used as a base film for a magnetic recording tape, voids around particles contained in the film are small. As a result, it is made possible to substantially prevent abrasion of the base film which would be caused by a die coater and a calender treatment in producing a magnetic recording tape.

The modified polyester (I) may contain additives such as a stabilizer, a colorant and an antistatic agent. For improving the slipperiness of the film, the modified polyester (I) may contain, as lubricants, a variety of inert solid fine particles to roughen the film surface.

Examples of the above solid fine particles preferably include (1) silicon dioxide and its hydrate, diatomaceous earth, siliceous sand and quartz; (2) alumina; (3) silicates containing at least 30% by weight of an $SiO_2$ component such as amorphous or crystalline clay minerals, aluminosilicate, calcined products thereof, hydrates thereof, chrysotile, zircon and fly ash: (4) oxides of Mg, Zn, Zr and Ti; (5) sulfides of Ca and Ba, (B) phosphates of Ni, Na and Ca, monohydrates thereof and dihydrates thereof; (7) benzoates of Li, Na and K; (8) terephthalates of Ca, Ba, Zn and Mm; (9) titanares of Mg, Ca, Ba, Zn, Cd, Pb, St, Mn, Fe, Co and Ni; (10) chromates of Ba and Pb; (11) carbon such as carbon black and graphite; (12) glass such as glass powders and glass beads; (13) carbonates of Ca and Mg; (14) fluorite; and (15) ZnS. Further preferred are silicon dioxide, anhydrous silicic acid, hydrous silicic acid, aluminum oxide, aluminum silicate, calcined products and hydrates thereof, monolithium phosphate, trilithium phosphate, sodium phosphate, calcium phosphate, barium sulfate, titanium oxide, lithium benzoate, double salts and hydrates of these compounds, glass powders, clays such as kaolin, bentonire and terra abla, talc, diatomaceous earth and calcium carbonate. Particularly preferred are silicon dioxide, titanium oxide and calcium carbonate.

The average particle diameter of the above inert solid fine particles is preferably 0.02 to 0.6 $\mu$m, and the amount thereof is preferably 0.005 to 0.5 part by weight.

The modified polyethylene-2,6-naphthalenedicarboxylate (I) used in the present invention can be produced by a method known per se. For example, the modified polyethylene-2,6-naphthalenedicarboxylate can be produced by mixing predetermined amounts of 2,6-naphthalenedicarboxylic acid, 4,4'-diphenyldicarboxylic acid and ethylene glycol, directly esterifying the resultant mixture under atmospheric pressure or elevated pressure and further subjecting the resultant esterification product to melt-polycondensation under reduced pressure. In this case, additives such as a catalyst may be used as required. The intrinsic viscosity, measured in o-chlorophenol at 25° C., of the modified polyethylene-2,6-naphthalenedicarboxylate is preferably 0.45 to 0.90 dl/g, particularly preferably 0.55 to 0.90 dl/g.

When the film according to the first invention is used as a base film for producing a magnetic recording tape, the thickness of the film is preferably 4 to 35 $\mu$m, more preferably 4 to 12 $\mu$m, particularly preferably 4 to 7 $\mu$m.

Further, when the film according to the first invention is used as a base film for producing a magnetic recording film, the Young's modulus thereof at least in the longitudinal direction or in the transverse direction is preferably at least 750 kg/mm², more preferably at least 800 kg/mm². Further, preferred is a film having a Young's modulus, in the longitudinal direction, of at least 650 kg/mm² and a Young's modulus, in the transverse direction, of at least 700 kg/mm². In general, the upper limit of the Young's modulus in the longitudinal direction is about 1,200 kg/mm², and the upper limit of the Young's modulus in the transverse direction is about 1,500 kg/mm².

When the Young's moduli are set within the above ranges, the magnetic recording tape can be prevented from undergoing elongation and permanent deformation in electron-editing the tape or at the time of stop and start, and the tape can be readily restored from strain. Moreover, since the touch of the tape to a recording and reproducing head can be excellently maintained, the variation in output is therefore small, and improved sound can be obtained.

For a use as an electrically insulating film, the crystal fusion heat of the oriented polyester film of the first invention is 10 to 24 Joule/g, preferably 15 to 24 Joule/g. When the film has a crystal fusion heat in the above range, the heat deterioration resistance can be excellently maintained, the amount of oligomers of the film is small, and the delamination of the film hardly occurs.

The oriented polyester film having the above properties is generally used in a thickness of 40 to 350 μm, preferably 40 to 250 μm, and the film is suitable for producing an insulating material for a motor, a dielectric material for a condenser, a substrate for a flexible circuit and a film for a membrane switch.

For a use as a base film for a magnetic recording tape and for use as an insulating film, the oriented polyester film of the first invention can be imparted with the preferred properties by a method known per se. .

For example, the dry modified polyethylene-2,6-naphthalenedicarboxylate is melt-extruded at a temperature between the melting point and the melting point +70° C., and solidified by cooling to obtain an unstretched film. Then, the unstretched film is stretched by a so-called consecutive lengthwise and widthwise stretching method in which an unstretched film is stretched in the longitudinal direction and then in the transverse direction, by a consecutive widthwise and lengthwise stretching method in which the above stretching order is reversed, by a simultaneous biaxial stretching method, or by a method in which a general biaxially stretched film is restretched. The stretching temperature and the stretch ratio are selected from known conditions so as to satisfy the above properties. Further, the thermosetting conditions are properly selected and determined according to the above film properties. The above consecutive lengthwise and widthwise stretching method is preferably carried out by first stretching the unstretched film in the longitudinal direction at a stretch ratio of 3.5 to 6.0 at a stretching temperature between 130° and 160° C., then stretching it in the transverse direction at a stretch ratio of 3.5 to 5.5 at a stretching temperature between 130° and 155° C., and thereafter thermosetting at a temperature between 180° and 250° C. under tension or limited shrinkage. The above consecutive widthwise and lengthwise stretching method is preferably carried out by first stretching the unstretched film in the transverse direction with a tenter at a stretch ratio of 3.5 to 5.5 at a stretching temperature between 130° and 160° C., then stretching the resultant film in the longitudinal direction between rolls having different peripheral speeds at a stretch ratio of 3.5 to 6.0 at a temperature between 150° and 170° C. and thermosetting the film at a temperature between 180° and 250° C. The method for restretching a biaxially stretched film is preferably carried out by stretching the unstretched film in the longitudinal direction at a stretch ratio of 1.8 to 2.8 at a temperature between 130° and 150° C., stretching it in the transverse direction at a stretch ratio of 3.8 to 5.2 at a temperature between 115° and 130° C. with a tenter, thermosetting the stretched film under tension or limited shrinkage at a temperature between 150° and 170° C., again stretching the film in the longitudinal direction at a stretch ratio of 1.5 to 3.5 at a temperature between 150° and 190° C., stretching the film in the transverse direction at a stretch ratio of 1.1 to 2.4 at a temperature between 170° and 200° C. with a tenter and finally thermosetting the stretched film under tension or limited shrinkage at a temperature between 180° and 250° C. The time for the thermosetting is preferably 5 to 20 seconds.

The oriented polyester film of the first invention is suitably usable as a base film for audio and video magnetic recording tapes of high grade such as an ultra-thin tape for recording of long duration, a magnetic film for high-density recording and a magnetic recording film for recording and reproducing high-quality images.

A magnetic layer and a method of forming the magnetic layer one surface or each of the surfaces of a base film are known, and such a known magnetic layer and a known method may be employed in the present invention.

For example, a magnetic layer is formed by applying a magnetic coating composition to a base film. In this case, the ferromagnetic powder for forming the magnetic layer is selected from known ferromagnetic materials such as $\gamma$-$Fe_2O_3$, Co-containing $\gamma$-$Fe_2O_3$, Co-containing $\gamma$-$Fe_3O_4$, $CrO_2$ and barium ferrite.

The binder used with the magnetic powder is selected from known thermoplastic resins, thermosetting resins, reactive resins and mixtures of these. Specific examples of these resins include a vinyl chloridevinyl acetate copolymer and polyurethane elastomer.

The magnetic coating composition may further contain an abradant (e.g., $\alpha$-$Al_2O_3$), an electrically conductive agent (e.g., carbon black), a dispersant (e.g., lecithin), a lubricant (e.g., n-butyl stearate and lecithin), a curing agent (e.g., epoxy resin) and a solvent (e.g., methyl ethyl ketone, methyl isobutyl ketone and toluene).

A magnetic layer may be also formed by a wet method such as electroless plating or electrolytic plating or a dry method such as vacuum vapor deposition, sputtering or ion plating.

When a magnetic layer is formed only on one surface of the base film, the other surface of the base film may be coated with an organic polymer to maintain the running properties as a tape.

The second invention will be detailed hereinafter.

The modified polyethylene-2,6-naphthalenedicarboxylate (II) (to be sometimes referred to as modified polyester (II) hereinafter) composing the oriented polyester film of the second invention contains ethylene-2,6-naphthalenedicarboxylate of the formula (1) described hereinbefore as a main recurring unit.

As a glycol component, the modified polyethylene-2,6-naphthalenedicarboxylate contains a glycol component derived from a compound represented by the following formula (2) in addition to an ethylene glycol component.

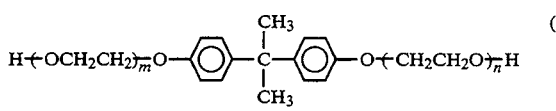

wherein each of n and m is 1 to 9 as an average, preferably a positive number of from 1 to 6, provided that m+n as an average equals a positive number of from 2 to 10, preferably 4 to 6, particularly preferably about 4.

The compound of the formula (2) can be obtained as an adduct of bisphenol A with ethylene oxide. In this case, the numbers, m and n, of ethylene oxides in the adduct are at random for each molecule, and m and n as averages can be determined depending upon the amount of ethylene oxide to be used.

The glycol component of the formula (2) is contained in the modified polyester (II) in such an amount that the modified polyester (II) shows a crystallization exothermic heat, determined by a measurement method to be described later, of 6 to 20 Joule/g, preferably 6 to 15 Joule/g.

The amount of the glycol component based on the total content of glycol components is preferably 0.1 to 2.0 mol%, particularly preferably 1.0 to 2.0 mol%.

An ethylene glycol component is a main glycol component in the modified polyester (II), and the amount of ethylene glycol based on the total content of glycol components is 98 to 99.9 mol%, particularly preferably 98 to 99 mol%.

The modified polyester (II) may contain a small amount of other glycol component in addition to the ethylene glycol component and the glycol component of the above formula (2). The above "other glycol component" includes component(s) derived from 1,3-propanediol, 1,4-butanediol, 1,6-hexanediol, neopentyl glycol, 1,4-cyclohexanedimethanol and p-xylylene glycol.

In the modified polyester (II) a 2,6-naphthalenedicarboxylic acid component is a main acid component, and the amount thereof based on the total acid components is at least 90 mol%, particularly preferably at least 95 mol%.

The modified polyester (II) may contain a small amount of other acid component in addition to the 2,6-naphthalenedicarboxylic acid component. The "other acid component" specifically includes components derived from aromatic dicarboxylic acids such as 1,5-naphthalenedicarboxylic acid, terephthalic acid, isophthalic acid, diphenylsulfonedicarboxylic acid and benzophenonedlcarboxylic acid; aliphatic dicarboxylic acids such as succinic acid, adipic acid, sebacic acid and dodecanedicarboxylic acid; and alicyclic dicarboxylic acids such as hexahydroterephthalic acid and 1,3-adamantanedicarboxylic acid.

The crystallization heat of the modified polyester (II) is 6 to 20 Joule/g, preferably 6 to 15 Joule/g, as was already described. When the modified polyester (II) shows a crystallization exothermic heat in the above range, the film produced from the modified polyester (II) can maintain stretchability and a high Young's modulus. Further, when the film is used as a base film for a magnetic recording tape, voids around fine particles contained in the film are small. As a result, it is made possible to substantially prevent abrasion of the base film which would be caused by a die coater and a calender treatment in producing a magnetic recording tape.

The modified polyester (II) may contain additives such as a stabilizer, a colorant and an antistatic agent. For improving the slipperiness of the film, the modified polyester (I) may contain, as lubricants, a variety of inert solid fine particles to roughen the film surface.

The inert solid fine particles are preferably selected from those described regarding the modified polyester (I) of the first invention, and the amount thereof is also as described regarding the modified polyester (I).

The modified polyethylene-2,6-naphthalenedicarboxylate (II) used in the present invention can be produced by a method known per se. For example, the modified polyethylene-2,6-naphthalenedicarboxylate can be produced by mixing predetermined amounts of 2,6-naphthalenedicarboxylic acid, ethylene glycol and the glycol component of the formula (2), directly esterifying the resultant mixture under atmospheric pressure or elevated pressure and further subjecting the resultant esterification product to melt-polycondensation under reduced pressure. In this case, additives such as a catalyst may be used as required. The intrinsic viscosity, measured in o-chlorophenol at 25° C., of the modified polyethylene-2,6-naphthalenedicarboxylate is preferably 0.45 to 0.90 dl/g, particularly preferably 0.55 to 0.90 dl/g.

When the oriented polyester film according to the second invention is used as a base film for a magnetic recording tape, the film thickness and Young's modulus are as described regarding the film according to the first invention.

For a use as an electrically insulating film, the crystal fusion endothermic heat of the oriented polyester film of the second invention is preferably 7 to 22 Joule/g, particularly preferably 7 to 16 Joule/g. When the film has a crystal fusion heat in the above range, the heat deterioration resistance of the film can be excellently maintained, the amount of oligomers of the film is small, and the delamination of the film hardly occurs.

The oriented polyester film having the above properties is generally used in a thickness of 40 to 350 μm, preferably 40 to 250 μm, and the film is suitable for producing electrically insulating films such as an insulating material for a motor, a dielectric material for a condenser, a substrate for a flexible circuit and a film for a membrane switch., For a use of the oriented polyester film of the second invention as a base film for a magnetic recording tape and for a use of the oriented polyester film as an electrically insulating film, the oriented polyester film having preferred properties can be produced by methods described regarding the oriented polyester film of the first invention.

Like the oriented polyester film of the first invention, the oriented polyester film of the second invention is suitably usable as a base film for audio and video magnetic recording tapes of high grade such as an ultra-thin tape for recording of long duration, a magnetic film for high-density recording and a magnetic recording film for recording and reproducing high-quality images.

A magnetic recording tape can be produced from the oriented polyester film of the second invention by the method described regarding the oriented polyester film of the first invention.

The present invention will be explained more in detail hereinafter by reference to Examples.

The physical property values and characteristics described in Examples 1–11 and Comparative Examples 1–5 were measured and defined as follows.

(1) Young's modulus

A film was cut to prepare a sample having a width of 10 mm and a length of 150 mm, and the sample was strained with an Instron type universal tensile tester at an interchuck distance of 100 mm at a straining rate of 10 mm/minute at a chart feeding rate of 500 mm/minute to prepare a load-elongation curve. The Young's modulus was calculated on the basis of a tangent on the rising part of the load-elongation curve.

(2) Crystallization heat

10 Milligrams of a sample from a biaxially oriented film or an unstretched film was placed in a sample pan, and temperature-increased up to 300° C. with a differential scanning calorimeter (DSC/580, supplied by Seiko Instrument & Electronics Ltd.) at a temperature elevation rate of 10° C./minute. The sample was maintained at this temperature for 10 minutes. Then, the sample was taken out of the DSC, and rapidly cooled by placing it in ice water. Further, the temperature of the sample was elevated in DSC at a temperature elevation rate of 10° C./minute to prepare a DSC curve.

The above DSC curve showed an exothermic peak by crystallization around 225° C. The crystallization heat was determined on the basis of the area of the exothermic peak.

(3) Electromagnetic conversion characteristics

A magnetic video tape was measured for an S/N ratio with a noise meter supplied by Shibasoku K. K. Further, a difference between the above S/N ratio and the S/N ratio of a tape of Comparative Example 1 shown in Table 1 was calculated.

As a VTR, EV-S700 supplied by Sony Corp. was used.

(4) Running durability of magnetic tape

While the running of a magnetic tape with a VTR (EV-S700, supplied by Sony Co. Ltd.) was started and stopped repeatedly for 100 hours, the magnetic tape was examined on its running state and measured for output. A magnetic tape which satisfied all of the following items was taken as excellent, and a magnetic tape which failed to satisfy any one of the items was taken as poor.

(i): A tape edge did not bend and a tape did not become a wavy shape.

(ii): A tape did not squeak in running.

(iii): A tape underwent neither tearing nor breaking.

(5) Abrasion

A film was slit to prepare a tape having a width of ½ inch, and the tape was allowed to run 50 m while one blade edge was vertically pressed to the tape so that the tape was pushed 1.5 mm apart from its normal running course (running tension: 60 g, running speed: 1 m/second). The abrasion was evaluated on the basis of the width of abrasion dust adhering to the one blade edge.

(6) Void area ratio

The surface of a film was ion-etched to expose fine particles in the film, and aluminum was uniformly vapor-deposited thereon in a thickness of 400 to 500 angstroms or less. Then, while the film surface was observed with a scanning electron microscope at a magnification of 3,500 to 5,000, voids around fine particles were measured for areas with an image analyzing apparatus Luzex 500 supplied by Nihon Regulator Co., Ltd. Further, the fine particles were similarly measured for areas, and the void area ratio was determined by dividing the areas of the voids by the areas of the fine particles.

The above ion-etching was carried out with a JFC-1100 ion-sputtering apparatus supplied by NEC Corp. at 500 V at 12.5 mA for 15 minutes. The vacuum degree was about $10^{-3}$ Torr. The particles measured had a size of about 0.3 μm or greater.

(7) Crystal fusion heat

A predetermined amount (10 mg) of a film sample was placed in a sample pan, and its temperature was raised with a differential scanning calorimeter (DSC/580 supplied by Seiko Instrument & Electronics Ltd.) at a temperature elevation rate of 10° C./minute to prepare an endothermic curve of crystal fusion. The crystal fusion heat was determined on the basis of the area of the endothermic curve.

(8) Heat deterioration resistance

A film was cut to prepare a sample having a width of 10 mm and a length of about 200 mm, and the sample was heat-deteriorated in an air oven set at 200° C. for predetermined periods of time. Then, the sample was taken out, and measured for mechanical properties (breaking strength and elongation). A time was measured until the breaking strength reached down up to 50% of the initial value of breaking strength.

(9) Amount of oligomer extract

A film (38 mm×38 mm) was immersed in 20 cc of chloroform at 25° C. for 1 hour, and the film was taken out. Then, the chloroform solution containing a remaining oligomer extract was measured for absorbance at a wavelength of 240 nm, and the oligomer amount was determined on the basis of the absorbance by reference to a preliminarily prepared calibration curve showing the relationship between the oligomer concentration and the absorbance.

The above absorbance was measured with a self-recording spectrophotometer HV-VIS-NIR supplied by Shimadzu Corporation.

(10) Delamination

Hundred holes were punched in films with a needle of a bag-forming machine (supplied by The New Long Manufacturing Co.). When a film underwent no delamination, it was punched to make holes having nearly the same size as the needle. When a film underwent delamination, a portion around each punched hole was separated into layers and damaged portions extended. The area of the holes including the damaged portions was measured, and the delamination was evaluated on the basis of the area.

A film in which the areas of holes including damaged portions were 1 to 1.5 times as large as the areas of the punched holes was taken as grade 1, a film in which the areas of holes including damaged portions were more than 1.5 to 2.0 times as large as the areas of the punched holes was taken as grade 2, and a film in which the areas of holes including damaged portions were more than 2.0 times as large as the areas of the punched holes was taken as grade 3.

EXAMPLES 1–8 AND COMPARATIVE EXAMPLES 1 AND 2

A non-modified polyethylene-2,6-naphthalenedicarboxylate (homopolymer) which contained 0.2 % by weight of fine silica particles having an average particle diameter of 0.1 μm and fine calcium carbonate particles having an average particle diameter of 0.6 μm and which had an intrinsic viscosity of 0.62 dl/g (measured in o-chlorophenol at 25° C.) was prepared from ethylene glycol and 2,6-naphthalenedicarboxylic acid according to a conventional method.

Further, modified polyethylene-2,6-naphthalenedicarboxylates (I) were prepared by copolymerizing 4,4'-diphenyldicarboxylic acid in amounts, based on the total amount of 2,6-naphthalenedicarboxylic acid and 4,4'-diphenyldicarboxylic acid, shown in Table 1, and modified polyethylene-2,6-naphthalenedicarboxylates (II) were prepared by copolymerizing a compound of the formula (2) (wherein, as averages, m was about 2, n was about 2 and n+m equaled about 4) in amounts, based on the total amount of ethylene glycol and the compound of formula (2), shown in Table 2. The particles (lubricant) concentration, intrinsic viscosity, etc., were adjusted so as to be the same as those of the above homopolymer.

Pellets of each of the above-obtained polymers were dried at 170° C. and then melt-extruded at 300° C. onto a casting drum set at 40° C. to rapidly cool and solidify the extrudates, whereby unstretched films were obtained.

The above unstretched films were stretched in the longitudinal direction at a stretch ratio of 4.85 at 125° C. through two rolls having a velocity difference, and stretched in the transverse direction at a stretch ratio of 5.15 at 135° C. with a tenter. Then, the stretched films were heat-treated at 215° C. for 10 seconds, and biaxially oriented polyester films having a thickness of 7 μm were taken up.

Separately, the following composition was placed in a ball mill and kneaded/dispersed for 16 hours, and 5 parts by weight of an isocyanate compound (Desmodur L, supplied by Bayer AG) was added. The mixture was dispersed under shear force at a high velocity to prepare a magnetic coating composition.

| Magnetic coating composition: | Part by weight |
|---|---|
| Acicular Fe particles | 100 |
| Vinyl chloride-vinyl acetate copolymer (Eslec 7A, supplied by Sekisui Chemical Co., Ltd.) | 15 |
| Thermoplastic polyurethane | 5 |
| Chromium oxide | 5 |
| Carbon black | 5 |
| Lecithin | 2 |
| Fatty acid ester | 1 |
| Toluene | 50 |
| Methyl ethyl ketone | 50 |
| Cyclohexanone | 50 |

The above-obtained magnetic coating composition was applied to one surface of each of the above biaxially oriented polyester films (the film of the homopolymer excluded) so that the coating thickness was 3 μm. Then, the coatings were subjected to orientation treatment in a direct-current magnetic field at 2,500 gauss, dried under heat at 100° C. with a super calender (linear pressure 200 kg/cm, temperature 80° C.), and taken up. The so-obtained rolls were allowed to stand in an oven at 55° C. for 8 days.

Further, the following back coating composition was applied to the other surface of each of the above films and dried so that the back coatings had a thickness of 1 μm. Further, the films were cut to prepare tapes having a width of 8 mm, whereby magnetic tapes were obtained.

| Back coating composition: | Part by weight |
|---|---|
| Carbon black | 100 |
| Thermoplastic polyurethane | 60 |
| Isocyanate compound (Coronate supplied by Nippon Polyurethane Industries, Ltd.) | 18 |
| Silicone oil | 0.5 |
| Methyl ethyl ketone | 250 |
| Toluene | 50 |

Tables 1 and 2 show the properties of the above-obtained films and magnetic tapes. These results show that the film of the present invention is excellent as a base film for a magnetic recording tape.

TABLE 1

| | Unit | Example 1 | Example 2 | Comp. Example 1 |
|---|---|---|---|---|
| Polymer | | | | |
| Amount of 4,4'-D co-polymerized | mole % | 1.50 | 3.0 | 0 |
| Crystallization heat | Joule/g | 25.2 | 21.0 | 26.3 |
| Properties of base film | | | | |
| Surface roughness (Ra) | μm | 0.005 | 0.005 | 0.005 |
| Young's modulus: | | | | |
| $E_M$ | kg/mm² | 700 | 700 | 700 |
| $E_T$ | kg/mm² | 710 | 700 | 700 |
| Void size | times | 4.5 | 5.3 | 6.2 |
| Abrasion: Width of white dust adherence | mm | 0.4 | 0.4 | 0.6 |
| Properties of tape | | | | |
| Electromagnetic conversion (Y-S/N) | dB | +2.5 | +2.3 | — |
| Running durability | — | Excellent | Excellent | — |

$E_M$: Young's modulus of longitudinal direction
$E_T$: Young's modulus of transverse direction
4,4'-D: 4,4'-Diphenyldicarboxylic acid

TABLE 2

| | Unit | Example 3 | Example 4 | Example 5 |
|---|---|---|---|---|
| Polymer | | | | |
| Amount of a compound of formula (1) copolymerized | mole % | 0.13 | 1.50 | 1.50 |
| Crystallization heat | Joule/g | 11.9 | 7.5 | 7.5 |
| Properties of base film | | | | |
| Surface roughness (Ra) | μM | 0.005 | 0.005 | 0.005 |
| Young's modulus: | | | | |
| $E_M$ | kg/mm² | 700 | 700 | 900 |
| $E_T$ | kg/mm² | 700 | 710 | 650 |
| Void size | times | 5.8 | 5.0 | 5.1 |
| Abrasion: Width of white dust | mm | 0.5 | 0.4 | 0.4 |

TABLE 2-continued

| | | | | |
|---|---|---|---|---|
| adherence Properties of tape | | | | |
| Electromagnetic conversion (Y-S/N) | dB | +2.5 | +2.2 | +1.5 |
| Running durability | — | Excellent | Excellent | Excellent |

| | Unit | Example 6 | Example 7 | Example 8 |
|---|---|---|---|---|
| Polymer | | | | |
| Amount of a compound of formula (1) copolymerized | mole % | 1.50 | 1.80 | 0.07 |
| Crystallization heat | Joule/g | 7.5 | 6.0 | 19.0 |
| Properties of base film | | | | |
| Surface roughness (Ra) | μm | 0.005 | 0.005 | 0.005 |
| Young's modulus: | | | | |
| $E_M$ | kg/mm$^2$ | 670 | 700 | 700 |
| $E_T$ | kg/mm$^2$ | 950 | 700 | 700 |
| Void size | times | 4.5 | 4.3 | 6.0 |
| Abrasion: Width of white dust adherence | mm | 0.3 | 0.3 | 0.5 |
| Properties of tape | | | | |
| Electromagnetic conversion (Y-S/N) | dB | +2.0 | +2.4 | +2.5 |
| Running durability | — | Excellent | Excellent | Excellent |

| | Unit | Comp. Example 1 | Comp. Example 2 |
|---|---|---|---|
| Polymer | | | |
| Amount of a compound of formula (1) copolymerized | mole % | 0 | 2.8 |
| Crystallization heat | Joule/g | 26.3 | 4.4 |
| Properties of base film | | | |
| Surface roughness (Ra) | μm | 0.005 | 0.005 |
| Young's modulus: | | | |
| $E_M$ | kg/mm$^2$ | 700 | 560 |
| $E_T$ | kg/mm | 700 | 570 |
| Void size | times | 6.2 | 4.4 |
| Abrasion: Width of white dust adherence | mm | 0.6 | 0.3 |
| Properties of tape | | | |
| Electromagnetic conversion (Y-S/N) | dB | — | +1.5 |
| Running durability | — | — | Poor |

$E_M$: Young's modulus of longitudinal direction
$E_T$: Young's modulus of transverse direction

EXAMPLES 9-11 AND COMPARATIVE EXAMPLES 3-5

Modified polyethylene-2,6-naphthalenedicarboxylates which were obtained by copolymerizing 4,4'-diphenyldicarboxylic acid in amounts, based on the total amount of 2,6-naphthalenedicarboxylic acid and 4,4'-diphenyldicarboxylic acid, shown in Table 3 and which contained, as a lubricant, 0.1% by weight of spherical fine silica particles having an average particle diameter of 0.3 μm and had an intrinsic viscosity of 0.63 were dried at 170° C., and then melt-extruded at 300° C. onto a casting drum set at 40° C. to rapidly cool the extrudates, whereby unstretched films were obtained.

The above unstretched films were heated through a heating roll, and while these films were heated with an infrared heater up to 130° C., the films were stretched in the longitudinal direction at a stretch ratio of 3.5. Then, the films were stretched in the transverse direction with a tenter at 148° C. at a stretch ratio of 3.6, and then heat-treated at 230° C. for 30 seconds, whereby biaxially oriented modified polyethylene-2,6-naphthalenedicarboxylate films having a thickness of 50 μm were obtained.

Table 3 shows the properties of these films.

Table 3 clearly shows that the films of Examples cause less delamination, have higher heat deterioration resistance and show smaller amounts of oligomer extracts, and that these films are excellent as electrically insulating films.

TABLE 3

| | Unit | Comp. Example 3 | Comp. Example 4 | Example 9 | Example 10 | Example 11 | Comp. Example 5 |
|---|---|---|---|---|---|---|---|
| Polymer | | | | | | | |
| Amount of 4,4'-D copolymerized | mole % | — | 0.05 | 1.5 | 3.0 | 5.0 | 7.0 |
| Crystallization heat | Joule/g | 26.3 | 26.2 | 25.2 | 21.2 | 16.0 | 10.5 |
| Film properties | | | | | | | |
| Crystal fusion heat | Joule/g | 24.4 | 24.3 | 24.0 | 18.4 | 10.0 | 8.0 |
| Time until strength decreased to a half of the initial value | hrs | 2000 | 1900 | 2200 | 2500 | 2300 | 1800 |

TABLE 3-continued

| | Unit | Comp. Example 3 | Comp. Example 4 | Example 9 | Example 10 | Example 11 | Comp. Example 5 |
|---|---|---|---|---|---|---|---|
| Amount of oligomer extract | mg/m² | 1.7 | 1.6 | 1.5 | 1.2 | 1.2 | 2.0 |
| Delamination | grade | 3 | 2 | 2 | 1 | 1 | 1 |

4,4'-D: 4,4'-Diphenyldicarboxylic acid

What is claimed is:

1. An oriented polyester film:
   (A') which comprises modified polyethylene-2,6-naphthalenedicarboxylate containing of a glycol component derived from a compound represented by the following formula,

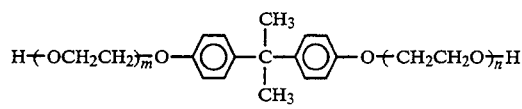

wherein each of n and m is independently a positive number of 1 to 9 as an average, provided that m+n equals 2 to 9 as an average, and having a heat of crystallization of 6 to 20 Joule/g, and
   (B) which is biaxially oriented.

2. The oriented polyester film of claim 1, (C') Which exhibits a heat of fusion of the crystal of 7 to Joule/g.

3. The oriented polyester film of claim 1, which has a thickness of 40 to 350 μm and is used for electric insulation.

4. The oriented polyester film of claim 1, which has a thickness of 4 to 35 μm and is used as a base film for a magnetic recording tape.

5. The oriented polyester film of claim 4, which has a Young's modulus of at least 750 kg/mm² in at least one direction of its longitudinal and transverse directions.

6. The oriented polyester film of claim 1, wherein the glycol component derived from the compound represented by the formula in claim 1 is contained in an amount of 0.1 to 2.0 mol% based on a total glycol component content of the modified polyethylene-2,6-naphthalenedicarboxylate.

7. The oriented polyester film of claim 6, wherein an ethylene glycol component is contained in an amount of 98 to 99.9 mol% based on a total glycol component content.

8. The oriented polyester film of claim 1, wherein 2,6-naphthalenedicarboxylic acid component is contained in an amount of at least 90 mol% based on a total acid component of the modified polyethylene-2,6-naphthalenedicarboxylate.

9. A magnetic recording tape comprising a magnetic film layer and a base film
   which comprises modified polyethylene-2,6-naphthalenedicarboxylate containing a 4,4'-diphenyldicarboxylic acid component as a polymerized unit in its polymer chain, in an amount of 1 to 5 mol% based on a total acid component content of the modified polyethylene-2,6-naphthalenedicarboxylate, and having a heat of crystallization of 16 to 25.5 Joule/g, and
   which is biaxially oriented.

10. An electric insulating film having electric insulating properties
    which comprises modified polyethylene-2,6-naphthalenedicarboxylate containing a 4,4'-diphenyldicarboxylic acid component as a polymerized unit in its polymer chain, in an amount of 1 to 5 mol% based on a total acid component content of the modified polyethylene-2,6-naphthalenedicarboxylate, and having a heat of crystallization of 16 to 25.5 Joule/g, and
    which is biaxially oriented.

11. A magnetic recording tape comprising a magnetic film layer and a base film
    which comprises modified polyethylene-2,6-naphthalenedicarboxylate containing a glycol component derived from a compound represented by the following formula,

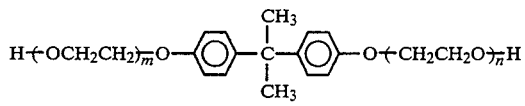

wherein each of n and m is independently a positive number of 1 to 9 as an average provided that m+n equals 2 to 9 as an average, and having a heat of crystallization of 6 to 20 Joule/g, and
    which is biaxially oriented.

12. An electric insulating film having electric insulating properties
    which comprises modified polyethylene-2,6-naphthalenedicarboxylate containing a glycol component derived from a compound represented by the following formula,

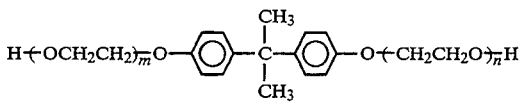

wherein each of n and m is independently a positive number of 1 to 9 as an average, provided that m+n equals 2 to 9 as an average, and having a heat of crystallization of 6 to 20 Joule/g, and
    which is biaxially oriented.

* * * * *